Aug. 25, 1964  E. S. ROBB ET AL  3,146,075
HEAT EXCHANGER
Filed March 8, 1962  2 Sheets-Sheet 1

INVENTORS:
EGERTON S. ROBB
JERRY G. MOFFETT, JR.
ORAN L. WYLIE, JR.
BY: Oswald H. Wilmore
THEIR ATTORNEY Aug. 25, 1964

E. S. ROBB ET AL 3,146,075

HEAT EXCHANGER

Filed March 8, 1962

INVENTORS
EGERTON S. ROBB
JERRY G. MOFFETT, JR.
ORAN L. WYLIE, JR.
BY: *Oswald H. Wilmore*

THEIR ATTORNEY

United States Patent Office 3,146,075
Patented Aug. 25, 1964

3,146,075
HEAT EXCHANGER
Egerton S. Robb, Port Washington, N.Y., and Jerry G. Moffett, Jr., Destrehan, and Oran L. Wylie, Jr., New Orleans, La., assignors to Shell Oil Company, New York, N.Y., a corporation of Delaware
Filed Mar. 8, 1962, Ser. No. 178,355
5 Claims. (Cl. 23—288)

The invention relates to a tubular heat exchanger suitable for mounting partly within another vessel, such as a reactor, whereby the process stream can enter the exchanger heat-transfer tubes soon after issuing from an element, such as a reactor tube, within said vessel. The invention is further concerned with the combination of a tubular reactor with such a heat exchanger. It is especially, although not exclusively, suitable for insuring the prompt cooling to a temperature below the reaction temperature of a reactant stream issuing from catalyst-packed reaction tubes wherein prompt cooling is important to avoid undesirable side reactions. Such side reactions are apt to occur, for example, whenever the reaction involves the oxidation of hydrocarbons. A specific example is the manufacture of acrolein, wherein the exchanger can be used as a desuperheater.

In certain chemical conversions, such as the manufacture of acrolein by flow of a mixture of propylene, steam and oxygen through tubes containing a suitable copper catalyst, said tubes being mounted in tube sheets within a vessel having end closures spaced from said tube sheets, it is important to cool the reacted stream promptly after it emerges from the reaction tubes. It was found that when such a stream was first collected in the end zone between the downstream tube sheet and the adjoining end closure and fed through a pipe into a heat exchanger, deleterious reactions occurred in the time between discharge from the reaction tubes and entry into the exchanger. This extended time is the consequence of the large volume between the downstream tube sheet and the closure made necessary by the dome-like shape of the latter, which is adopted for structural reasons, especially when high pressures are used.

Also, it is often important to control the temperature to which such a stream is cooled in the exchanger to avoid plugging of the exchanger tubes by deposits. Thus, it is often not feasible to add an anti-fouling agent to the reacted stream because this would contaminate the product. It was found that in processes, such as the manufacture of acrolein, wherein the reaction can be effectively checked without cooling the reacted stream so deeply as to cause condensation, plugging can be avoided by cooling the reacted stream to a temperature just above the dew point, so that the effluent remains in the vapor state while in the exchanger. This is useful whenever said temperature is sufficiently below the reaction temperature to stop undesirable side reactions.

It is the object of the invention to provide a heat exchanger suitable for mounting partly within a larger vessel, to permit a process stream produced within the vessel to enter the exchanger directly, without first flowing through a connecting pipe.

It is a further object to provide an improved tubular reactor having reactor tube sheets which are spaced from the reactor end closures and carry the tubes, wherein said vessel is provided with a cooling exchanger having a tube sheet mounted in close relation to the reactor tube sheet at which the reacted stream emerges from the tubes, arranged to minimize the residence time of the reacted stream between emergence from the reaction tubes and entry into the cooling tubes of the exchanger.

Still another object is to control the temperature of the coolant within the heat exchanger by regulating the pressure of the cooling medium.

These and other objects are effected by providing a heat exchanger having longitudinally spaced exchanger tube sheets mounted within a shell and connected by heat transfer tubes, wherein the two openings in the exchanger shell, respectively for the entry of coolant into the inter-tube sheet space near one tube sheet and for the discharge of coolant from said space near the other tube sheet, are both situated at a point remote from one of the said tube sheets, whereby the exchanger shell can be inserted into a vessel to bring the last-mentioned exchanger tube sheet into close proximity to an interior region of the vessel. This is effected by mounting a duct within the exchanger shell leading from a point within the inter-tube sheet space near the said tube sheet to the said displaced opening.

As applied specifically to a tubular reactor containing reactor tube sheets, the exchanger shell extends inwardly through an opening in the end closure at the discharge end of the reactor vessel, to bring one of the exchanger tube sheets into the vessel and to close proximity to the reactor tube sheet. Preferably, the reactor vessel contains a partition which extends radially outwards from the exchanger shell to the reactor vessel wall and is substantially parallel to the reactor tube sheet and in close relation therto, so define a narrow passage through which the reactant stream emerging from the reactor tubes flows radially and at high velocity to the exchanger and into the cooling tubes thereof.

Cooling of the reactant stream is advantageously effected by admitting a liquid such as water into the exchanger shell and discharging stream therefrom, and the cooling temperature is closely controlled by regulating the pressure at which vaporization of the coolant occurs. This involves measuring continuously the pressure of the vaporized coolant and either bleeding off vapor if the pressure becomes too high or admitting vapor at a higher pressure when the pressure falls.

The invention will be further described with reference to the accompanying drawing showing a preferred embodiment, wherein.

Figure 1:
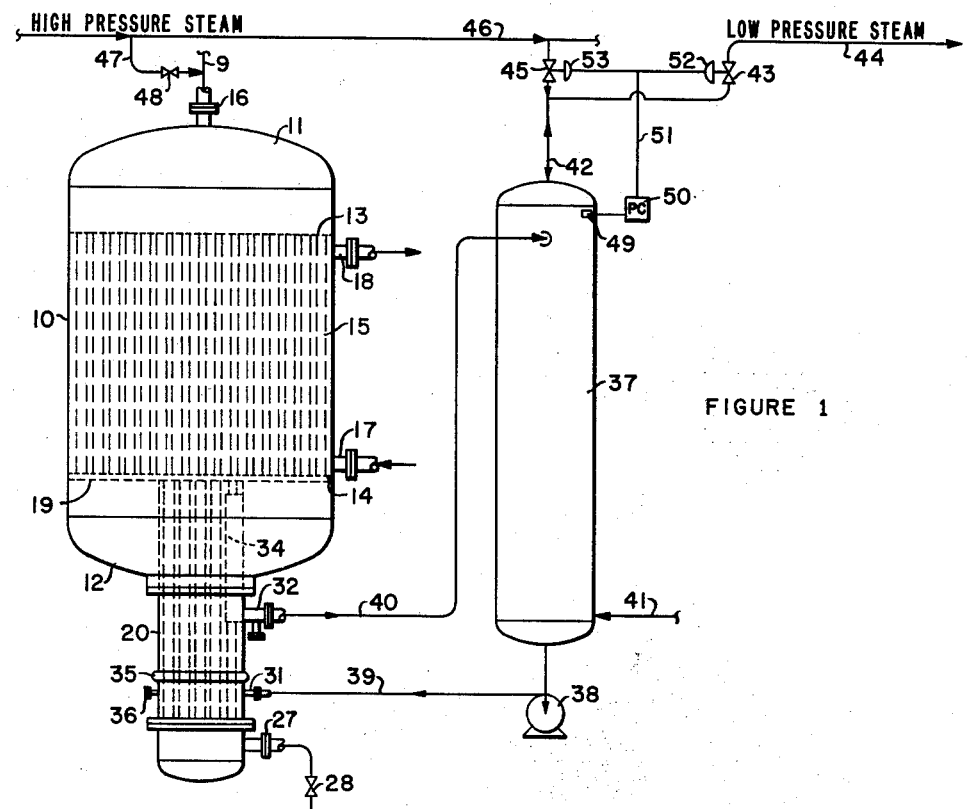
FIGURE 1 is a diagrammatic elevational view of a reactor and heat exchanger combination together with means for controlling the cooling temperature.

Referring to FIGURE 1, the reactor comprises a pressure vessel 10 having top and bottom dome-shaped closures 11, 12 and containing upper and lower reactor tube sheets 13, 14, and a plurality of reactor tubes 15, each containing granular catalyst. The tube sheets are spaced vertically from the end closures for structural reasons. The top closure 11 has an inlet at 16 by which a reactant from a source 9 is introduced for flow through the several tubes. These tubes are cooled externally by a coolant, such as a liquid which is vaporized at the reaction temperature, admitted into the inter-tube sheet space through an inlet 17 and discharged as a vapor through the outlet 18. Mounted just below the lower tube sheet with a small spacing is a partition 19 which has a central opening to which is fitted the upper end of the shell 20 of a cooling heat exchanger, which extends downwards through an opening in the bottom closure 12 and is sealed thereto, e.g., as appears in FIGURE 3, by a ring 21 welded to the exchanger shell 20 and bolted to a mating ring 22 on the closure. The closure 12 has a normally closed manway 12a.

Figure 2:
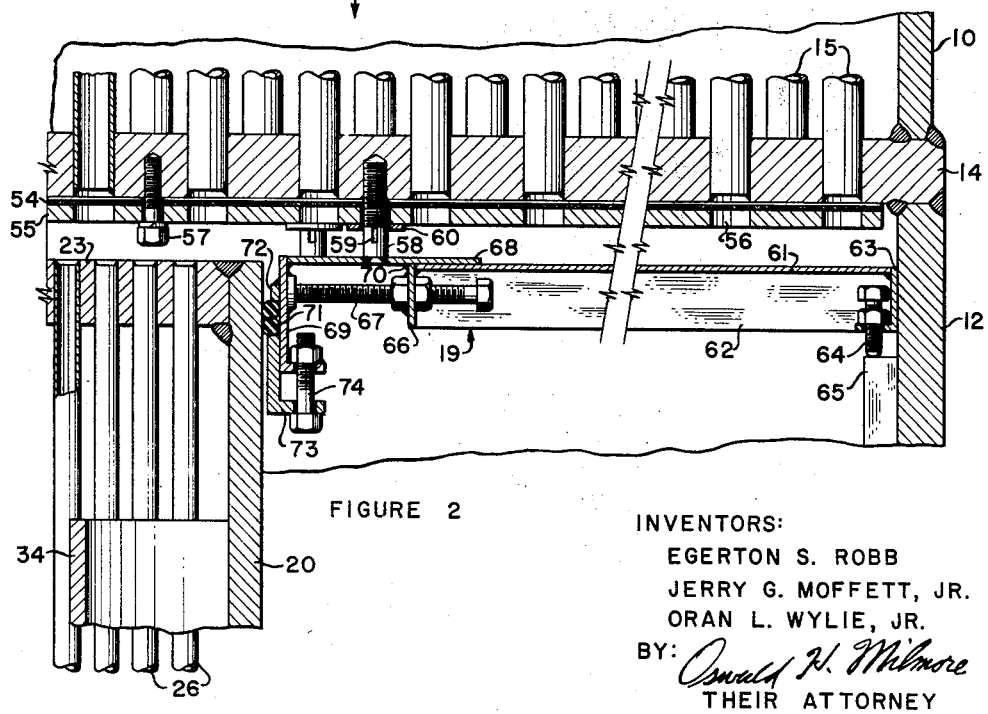
FIGURE 2 is an enlarged, fragmentary sectional view through a lower part of the reactor vessel and the top of the heat exchanger.
Figures 3, 4:
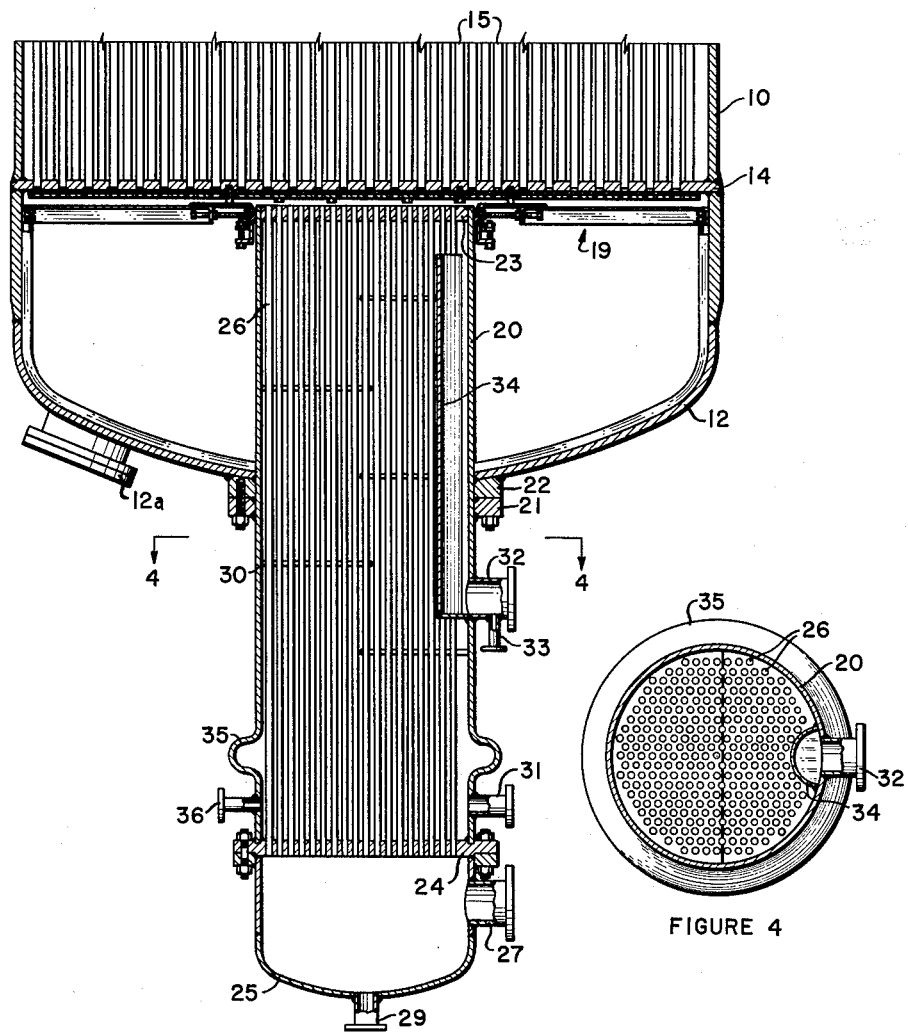
FIGURE 3 is a vertical sectional view through the heat exchanger, showing the bottom of the reactor.
FIGURE 4 is a transverse sectional view taken on the line 4—4 of FIGURE 3.

As appears further in FIGURES 2–4, the exchanger shell is open at the top and contains at its end an upper tube sheet 23 situated within the reactor vessel near to the reactor tube sheet 14; it further contains a lower tube sheet 24, situated outside of the vessel. A casing 25 is bolted to the bottom of the exchanger shell to define an outlet chamber. Heat transfer tubes 26 extend between the tubes sheets 23 and 24 for the downward flow of the reacted stream into the outlet chamber, from which it is discharged through an outlet nozzle 27 and a valve 28. A normally closed drain opening 29 is provided at the bottom. The inter-tube sheet space advantageously contains staggered transverse baffles 30 for directing the flow of coolant, which is admitted at the bottom of this space through an inlet 31. Spent coolant is discharged through an outlet 32 having a normally closed drain 33. The outlet 32 and inlet 31 form first and second passageways through the exchanger shell, both of which are situated in spaced relation to the upper tube sheet 23 so as to lie outside of the reaction vessel, i.e., below the closure 12. The latter passageway is situated near the lower tube sheet 24. The outlet 32 communicates with a duct which is inside the shell and defined in part by a wall 34 which is fixed to the shell wall and in part by the wall itself. This duct is open near the upper tube sheet 23 to receive spent coolant. To permit the tube sheets to be fixed to the shell while permitting differential thermal expansion the shell includes an annular bulge 35. Just below this bulge is an auxiliary inlet 36, which may be closed and is provided principally for blowdown.

Reverting to FIGURE 1, in one mode of operation the coolant for the exchanger is water, supplied to the inlet 31 from a flash drum 37 by a pump 38 and pipe 39, and the water is vaporized within the exchanger. Steam, often containing liquid, is then drawn off from the vicinity of the upper tube sheet 23 via the duct at the wall 34, the outlet 32 and a pipe 40, and is admitted tangentially to the top of the drum 37. Make-up water may be admitted to the drum at 41. Steam can be discharged from or admitted to the drum through a pipe 42 which is connected by a valve 43 to a low-pressure steam discharge pipe 44 and, by a valve 45, to a source of high-pressure steam supplied by a pipe 46. The pipe 46 may be further connected to the reactor inlet 16 by a branch pipe 47 and a valve 48 to admix steam to the entering reactant in the pipe 9. The drum 37 contains a pressure-sensing element 49 which is connected to a pressure-controller 50. The latter emits a signal indicative of the pressure within the drum, e.g., a pneumatic pressure, which is transmitted by a duct 51 to valve operators 52 and 53. The operators are adjusted to open the valve 43 and discharge steam from the drum whenever the pressure in the drum exceeds a predetermined value, which may be set at the controller 50, and to open the valve 45 to admit steam from the pipe 46 whenever the pressure falls below said value. In practice the operators are adjusted so that there is a small range of pressures at which both valves are closed.

Referring again to FIGURE 2, there is a screen 54 held below the reactor tube sheet 14 by a retaining plate 55 having holes 56 in alignment with the reactor tubes for the efflux of the reactant stream. The function of the screen is to retain granular catalyst within the tubes. The retaining plate is supported from the tube sheet by capscrews 57 in the central area above the exchanger shell 20 and by studs 58 in the outer area. These studs also serve as spacers, as will appear, and have horizontal holes 59 for receiving wedges (not shown for clarity) by which washers 60 are held up against the plate 55.

The partition 19 is composed of numerous sections, small enough to be introduced through the central opening in the closure 12 or through the manway 12a. Thus, it may include a circumferential series of peripheral plates 61, having radial flanges 62 by which they are joined by welding, and annular skirts 63 to which are attached support screws 64 which rest on an abutment 65 on the closure 12. At the radially inner edge of the plates 61 are downturned flanges 66 carrying horizontal adjusting screws, which are mounted in nuts welded on the insides of the flanges and secured by lock nuts, as shown. The annular area between the shell 20 and flanges 66 is closed by an annular plate 68 (which also can be formed of sections to permit introduction into the reactor vessel) having a flange 69 against which the screws 67 press to adjust the position and center the plate 68 during assembly. The plate 68 is spaced beneath the plate 55 by the studs 58, to which it is plug-welded. Such studs and plug welds would also be provided above the plates 61, these being omitted for clarity. After adjustment, the plates 61 are welded to the plate 68 as shown at 70. The flange 69 is sealed to the exchanger shell 20 by O-rings 71 pressed upward against an abutment ring 72 by a gland 73 and bolts 74.

With regard to dimensions, it may be noted that the height of the chamber within the closure 12 below the partition 19 may be about 5 feet, sufficient to permit workmen to install the parts described; in such a case the space between the plate 55 and the partition plates 61 and 68, as determined by the spacing studs 58, is about 1.5 inches.

The heat exchanger can be readily attached to and withdrawn from the reactor, e.g., for cleaning. To remove the exchanger the gland 73 is lowered and the ring 21 is unbolted from the ring 22.

In operation, the reactant stream issuing from the reactor tubes 15 flows either directly into the heat exchanger tubes 26 or flows radially inwards to the latter through the thin space above the partition 19. This insures that the reacted stream is cooled promptly to bring it to a temperature below reaction temperature.

When, as in the manufacture of acrolein, the reacted stream is in the vapor stream and such a stream is prone to foul the exchanger tubes if cooled to condensing temperature, it is preferable to control the cooling temperature to a level above the dew point of the said stream.

We claim as our invention:

1. A heat exchanger which comprises:
    (*a*) a tubular shell containing a first and a second transverse tube sheet situated respectively near a first and a second end of the shell and a plurality of heat transfer tubes connected to both said tube sheets, and means spaced from both ends of the shell for mounting said shell to a supporting vessel which has an opening when the part of the shell between said first end and said mounting means is inserted into the vessel through said opening,
    (*b*) a closure at the second end of the shell defining, together with the second tube sheet, an outlet chamber, said chamber having outlet means,
    (*c*) the first end of said shell being open for the inflow of a fluid stream to be cooled through said tubes, and
    (*d*) means for circulating a thermal fluid through the space within the shell between said tube sheets in external contact with the tubes, said means including:
        (1) a first passageway extending through the shell wall at a location situated between said mounting means and the second tube sheet and in spaced relation to said first tube sheet, and including a duct situated within said shell and open to said space near said first tube sheet, and
        (2) a second passageway through the shell wall open to said space near the second tube sheet.

2. The combination of:
    (*a*) a tubular reactor which includes:
        (1) a reactor vessel having a first and a second end closure, and containing a pair of spaced transverse reactor tube sheets and a plurality of reactor tubes inter-connecting said tube sheets, said second closure having an opening therein,
        (3) inlet means for introducing a reactant stream into the space adjacent said first end closure for flow through said reactor tubes, and (b) a heat exchanger as defined in claim 1 having a shell of lesser external diameter than that of the reactor vessel, the said first end of said shell, including the part thereof which contains the first tube sheet, being situated inside the reactor vessel to receive said stream after issuing from the reactor tubes, said shell extending through said opening in the second end closure of the reactor, said first and second passageways being situated outside the reactor vessel.

3. In combination with the element recited in claim 2, a partition situated within said reactor vessel closely spaced from the reactor tube sheet which is adjacent to the heat exchanger on the side of said tube sheet remote from the tubes, said partition having a central opening and being connected at said opening to the first end of the heat exchanger.

4. The combination of:
   (a) a reactor comprising a cylindrical vessel having end closures, a pair of spaced reactor tube sheets, a plurality of reactor tubes containing catalyst and connected to said tube sheets, and means for admitting a reactant stream to the space adjoining one of said closures for flow through said tubes, the other closure having a central opening,
   (b) a cooling heat exchanger comprising a shell extending into said reactor vessel through said opening in the other closure, said shell
      (1) being open at the inner end and having thereat an exchanger tube sheet situated inside the reactor vessel close to a reactor tube sheet,
      (2) containing further a second exchanger tube sheet situated outside of said reactor vessel, and a plurality of exchanger tubes for the flow of reacted stream to be cooled connected to the exchanger,
      (3) having an outlet for the cooled reacted stream, and
      (4) separate means both connected to said shell at a point outside the reactor vessel for admitting a cooling liquid near one exchanger tube sheet into the space between said tube sheets and for discharging spent cooling fluid containing vapor from a point in said space adjacent to the other tube sheet.

5. The combination of:
   (a) a reactor comprising:
      (1) an upright cylindrical reactor vessel having upper and lower dome-shaped end closures and a pair of horizontal, vertically spaced reactor tube sheets situated in spaced relation to said closures, and a plurality of vertical reactor tubes containing catalyst and connected to said tube sheets,
      (2) means for flowing a cooling fluid through the space within said reactor vessel between said tube sheets in external contact with the reactor tubes,
      (3) means for introducing a reactant stream into the vessel above the upper tube sheet, and
      (4) a horizontal partition beneath and closely spaced from said lower tube sheet,
      (5) said partition and lower closure having central openings therein, and
   (b) a cooler for said reactant stream after issuing from said reactor tubes including:
      (1) a tubular shell of smaller external diameter than said vessel having the upper end thereof situated within said reactor vessel at approximately the level of said partition and communicating with the space between said lower reactor tube sheet and the partition through said opening in the latter, said shell extending downwards below the lower reactor closure through said opening therein,
      (2) upper and lower exchanger tube sheets within said shell, one being situated at the upper end of the shell inside the reactor vessel and the other at a lower part of the shell, and a plurality of cooling tubes connected between said exchanger tube sheets,
      (3) a closure at the lower end of the shell defining, together with the lower exchanger tube sheet, an outlet chamber, said chamber having outlet means,
      (4) inlet means situated outside of the reactor vessel for admitting cooling liquid to the space within said shell between the tube sheets therein situated near the lower exchanger tube sheet,
      (5) a duct for vapor-containing fluid within said shell having an inlet in communication with said space near the upper exchanger tube sheet and extending downwards to a level below the bottom of the lower reactor vessel closure, and
      (6) outlet means connected to the bottom of said duct and extending out through said shell outside of the reactor vessel.

References Cited in the file of this patent

UNITED STATES PATENTS

| | | |
|---|---|---|
| 2,248,993 | Houdry | July 15, 1941 |
| 2,260,153 | Nofsinger | Oct. 21, 1941 |
| 2,406,908 | Schideler et al. | Sept. 3, 1946 |
| 2,411,097 | Kopp | Nov. 12, 1946 |
| 2,532,756 | Brunjes et al. | Dec. 5, 1950 |
| 3,043,651 | Pietzsch | July 10, 1962 |

FOREIGN PATENTS

| | | |
|---|---|---|
| 730,375 | Great Britain | May 25, 1955 |